United States Patent [19]

Nishimura

[11] Patent Number: 5,012,375
[45] Date of Patent: Apr. 30, 1991

[54] WIDE-WRITE, NARROW-READ, SINGLE-GAP MAGNETIC HEAD

[75] Inventor: Masaru Nishimura, Hyogo, Japan

[73] Assignee: Mitsubishi Denki K.K., Tokyo, Japan

[21] Appl. No.: 401,762

[22] Filed: Sep. 1, 1989

[30] Foreign Application Priority Data

Sep. 2, 1988 [JP] Japan .................. 63-220062

[51] Int. Cl.$^5$ .................. G11B 5/23; G11B 5/147
[52] U.S. Cl. .................. 360/119; 360/126
[58] Field of Search .......... 360/115, 119, 121, 120, 360/126

[56] References Cited

U.S. PATENT DOCUMENTS

| | | | |
|---|---|---|---|
| 4,405,959 | 9/1983 | Chabrolle | 360/119 |
| 4,646,184 | 2/1987 | Goto et al. | 360/110 |
| 4,772,967 | 9/1988 | Okuda et al. | 360/119 |
| 4,815,197 | 3/1989 | Ota et al. | 360/120 |
| 4,821,126 | 4/1989 | Matsumoto | 360/119 |
| 4,849,841 | 7/1989 | Sokolik | 360/119 |

FOREIGN PATENT DOCUMENTS

| | | |
|---|---|---|
| 60-066310 | 4/1985 | Japan. |
| 60-087411 | 5/1985 | Japan. |
| 63-269310 | 11/1988 | Japan .................. 360/119 |

OTHER PUBLICATIONS

IBM Disclosure Bulletin (Technical), vol. 27, No. 9, Feb. 85, Nassimbene.

*Primary Examiner*—A. J. Heinz
*Assistant Examiner*—Jeff Evans
*Attorney, Agent, or Firm*—Kanesaka & Takeuchi

[57] ABSTRACT

A magnetic head without an erase head, which includes a substantially U-shaped magnetic core with opposed end faces of a pair of legs forming a gap; and a magnetic material attached to one of the end faces to form a write read head with the other end face to write and read data from a recording medium. The magnetic material has a saturated flux density lower than that of the magnetic core. A read track width made by the magnetic material and the other end face is smaller than a write track width made by the opposed end faces.

5 Claims, 12 Drawing Sheets

WIDE-WRITE, NARROW-READ, SINGLE-GAP MAGNETIC HEAD

BACKGROUND OF THE INVENTION

This invention relates to magnetic heads used in magnetic recording devices, such as magnetic disk or floppy disk devices, for magnetically writing and reading data from recording medium.

Reference is made to FIGS. 12-17 wherein a conventional magnetic head is shown.

FIGS. 12 and 13 are a side elevational view and a top plan view of a conventional magnetic head such as shown in U.S. Pat. No. 4,646,184. This magnetic head includes a write/read head 1, an erase head 2, a gap 3, an erase gap 4, a central spacer 5, a magnetic core 6 with legs 6a, 6b forming the gap 3, a magnetic core 7 with legs 7a, 7b forming the gap 4, a write/read coil 8, an erase coil 9, and another magnetic material 10 having a magnetic flux density lower than that of the magnetic core 6. Gr is the read gap, Gw the write gap, and T the write/read track width.

FIGS. 14-16 illustrate the conventional magnetic head and the data track, the write operation, and the read operation, respectively, wherein 11, 11a, 11b, 11c, and 11d are the data track, 12a and 12b are the guard band between the data tracks, A is the direction in which the recording medium is advancing.

FIG. 17 is a block diagram of a write signal unit for controlling the magnetic head. The write signal unit includes a modulation circuit 13, a write amplifier 14, a control circuit 15, and an erase circuit 16.

In operation, a high-frequency write data signal is modulated in the modulation circuit 13 and amplified in the write amplifier 14, and transmitted to the write/read head 1 via the write read coil 8. The electrical signal in the write read coil 8 excites the magnetic core 6 of the write/read head 1 by electromagnetic induction. Part of the magnetic flux thus produced becomes leakage flux through the gap 3 to magnetize the recording medium for writing data thereon.

For reading the data, when the write/read head 1 moves over the recording medium, the leakage flux enters the magnetic core 6 via the gap 3 and interlinks with the coil 8 to induce a voltage therein.

Thus, the material and width of the gap 3 have great influences on the write/read characteristics. For writing, the gap and the saturated flux density of the core 6 should be large and high respectively. For reading, the gap should be small in order to pick up accurately changes of the leakage flux from the recording medium. In this case, the saturated flux density of the magnetic core 6 may be low. The write head and the read head are used to be separated but, today, they are integrated as a write/read head. Thus, today's gap of the write/read head is not an ideal but a compromise of those for write and read heads.

The aforementioned write/read head 1 has been developed to improve this drawback. The magnetic material 10 having a saturated flux density lower than that of the magnetic core 6 is secured to the end face 6x of a core leg 6a so that the write gap Gw made by the ends faces 6x, 6y of the legs 6a, 6b is used for writing while the read gap Gr made by the magnetic material 10 and the end face 6y of the leg 6b is used for reading. That is, during writing, the amount of leakage flux from the wide gap Gw made of the magnetic core of a high saturated flux density becomes large so that the recording medium is highly magnetized. On the other hand, during reading, the narrow gap Gr made of a magnetic material of low saturated flux density makes it possible to follow small changes in the leakage flux from the recording medium.

As shown in FIGS. 12 and 13, the erase head 2 is integrated with the write/read head 1 via the central spacer 5 to form a magnetic head. The erase head 2 has two erase gaps 4 about either end of the write/read track width T of the write/read head 1. When the write/read head 1 writes a data signal, the erase circuit 16 receives a signal from the control circuit 15 to supply electric current to the erase coil 9, thereby operating the erase head 2.

FIG. 14 illustrates that the erase head 2 is erasing both edge portions of the data track 11 on which the data signal has been written by the write/read head 1. In general, when writing and/or reading data signals from the recording medium is repeated or carried out in another device, the magnetic head gets out of position. Consequently, not all part of a data signal is erased as a new data signal is written. This remaining signal or a signal from the adjacent track makes noise during reading. For this reason, the both edges of a data track on which a data signal has been written are erased to eliminate this noise.

As shown in FIG. 15, there are guard bands 12a, 12b between the data tracks 11a, 11b, 11c which are made by the erase head 2. Thus, when the write/read head 1 gets out of position on the track 11b to write the next data signal, the new data track 11d is protected by guard bands 12a, 12b, thereby preventing noise generation.

Aa shown in FIG. 16, even if the write/read head 1 is out of position on the track 11d for reading, it does not pick up noise or a signal from the adjacent track 11a because of the presence of the guard band 12a.

As has been described above, the conventional magnetic head, which consists of the write/read head 1 and the erase head 2, is complex and expensive to make. In addition, it requires the control circuit, erase circuit, and erase coil for operating the erase head, making the whole device complex and expensive.

SUMMARY OF THE INVENTION

Accordingly, it is an object of the invention to provide a simple and inexpensive magnetic head which is free of noise arising from the remaining data track or adjacent track without using the erase head.

According to the invention there is provided a magnetic head with no erase head, which includes a substantially U-shaped magnetic core with opposed end faces of a pair of legs forming a gap; and a magnetic material attached to one of the end faces to form a write/read head with the other end face to write and read data from a recording medium. The magnetic material has a saturated flux density lower than that of the magnetic core. A read track width made by the magnetic material and the other end face is smaller than a write track width made by the opposed end faces.

The above and other objects, features, and advantages of the invention will become more apparent from the following description when taken in conjunction with the accompanying drawings.

DESCRIPTION OF THE PREFERRED EMBODIMENT

Figure 1:
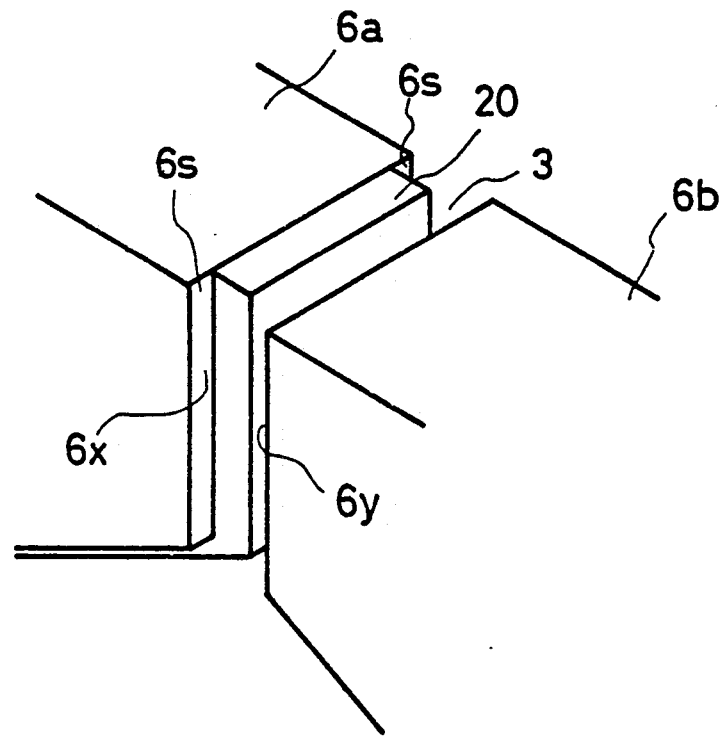
FIG. 1 is an enlarged perspective view of a gap portion of a magnetic head according to an embodiment of the invention.
Figure 2B:
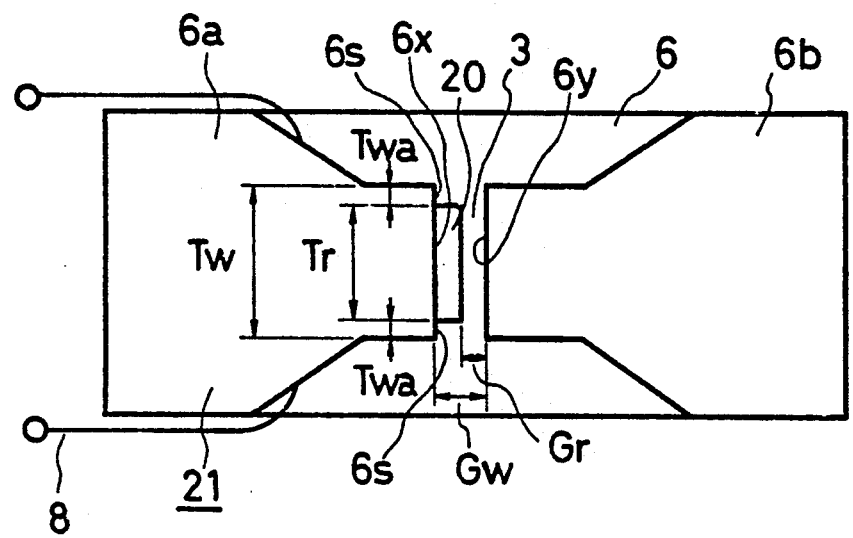
FIG. 2(b) is a top plan view of the magnetic head.
Figure 2A:
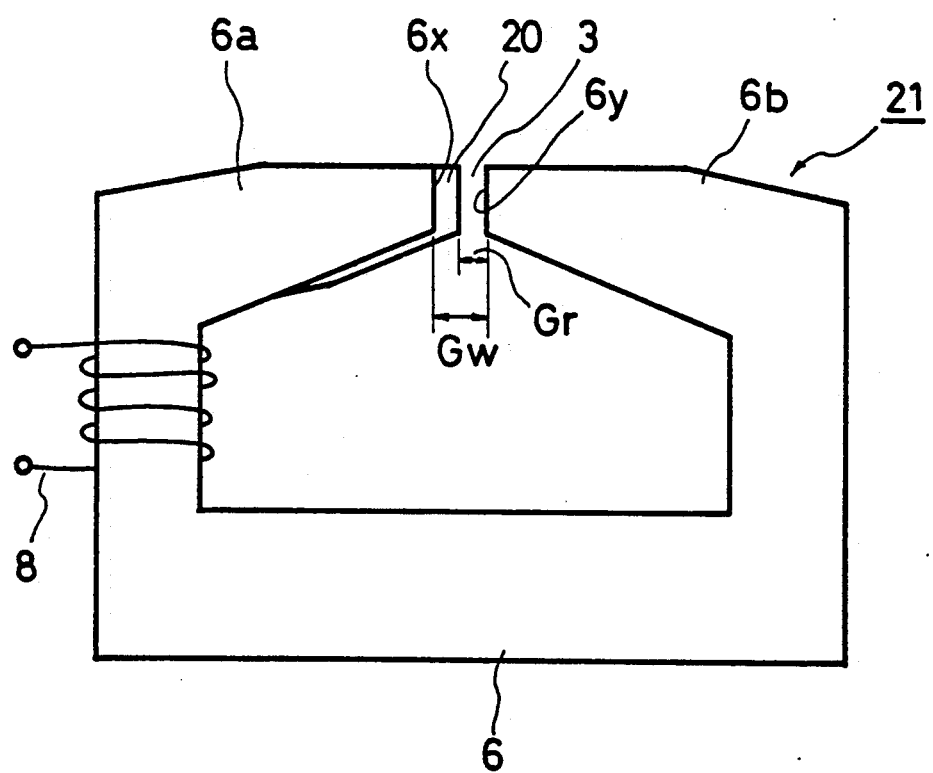
FIG. 2(a) is an elevational side view of the magnetic head.
Figure 3:
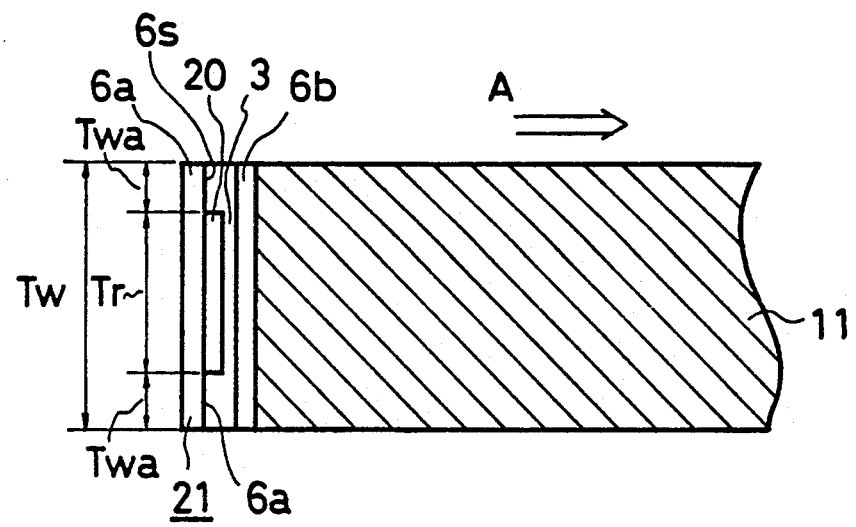
FIG. 3 shows the relationship between the magnetic head and the data track.

In FIGS. 1-2, a write/read head 21 has a magnetic material 20, which has a saturated flux density lower than that of the magnetic core 6, provided on the end face 6x of a core leg 6a. The read track width Tr defined by the magnetic material 20 and the end face 6y is smaller than the write track width Tw defined by the end faces 6x, 6y of the core legs 6a, 6b.

Figure 6:
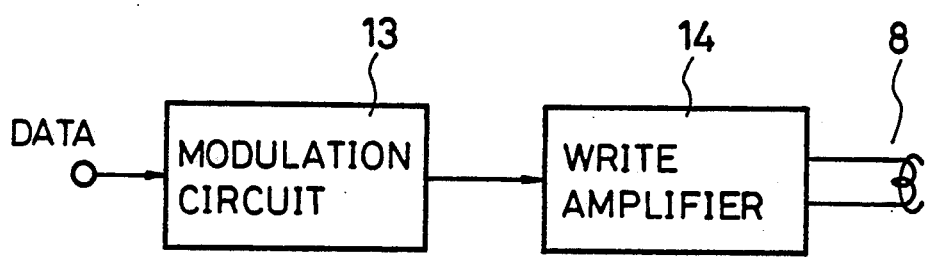
FIG. 6 is a block diagram of a write signal unit according to an embodiment of the invention.

In operation, as shown in FIG. 6, the magnetic core 6 is excited to produce a magnetic flux by supplying a high frequency data signal to the write/read coil 8 via the modulation circuit 13 and the write amplifier 14. Part of the magnetic flux leaks from the gap 3 and passes through the recording medium to write a data signal. At this point, the magnetic material 20 is saturated with flux so that there is also leakage flux from adjacent edge portions of the core leg 6a, forming a write gap Gw with the opposed end face 6y. Thus, data is written with a write track width Tw.

Since the magnetic material 20 is not saturated during reading, the magnetic material 20 and the end face 6y of the core leg 6b form a read gap Gr. The write gap Gw between edge portions 6s and the end face 6y is greater than the read gap Gr so that it is difficult for the write/read head to read the h-f data signal because of the gap loss.

Figure 7:
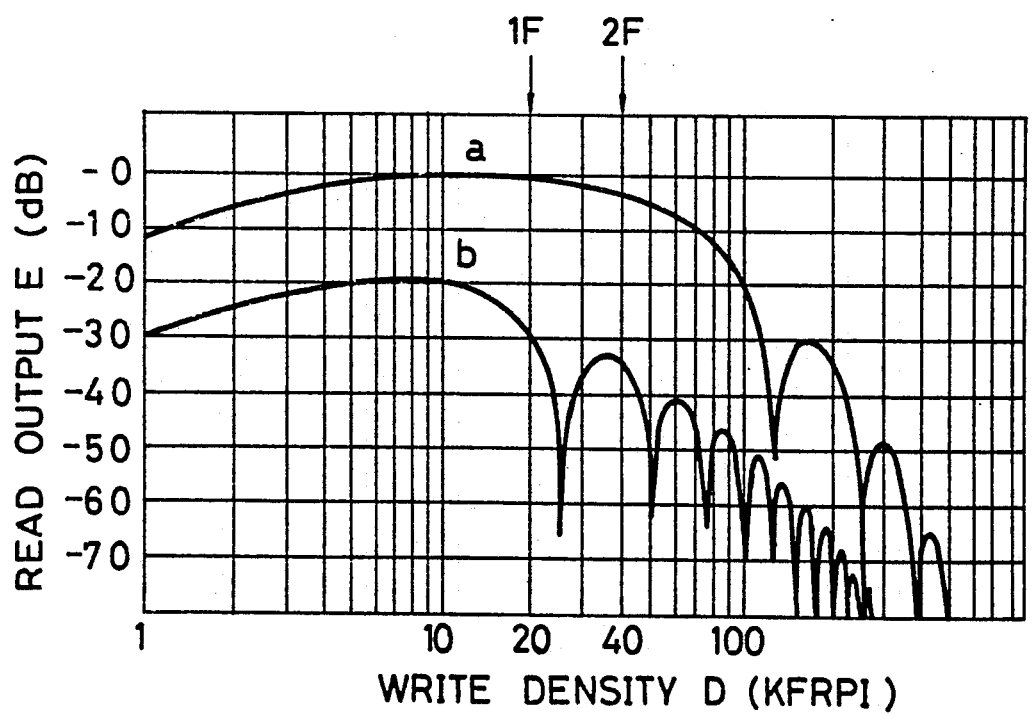
FIG. 7 is a graph showing the read output from the write/read head.

For example, when the write gap Gw is 2 $\mu$m, the read gap 0.4 $\mu$m, the write track width Tw 50 $\mu$m, and the read track width Tr 40 $\mu$m (Tw:Tr=1:0.8), the computation results of read output with respect to the write density are shown in FIG. 7, wherein E represents the read output computed, D the write density, a the output signal read with the read track width Tr, and b the output signal read by the edge portions 6s which are differences between the write track width Tw and the read track width Tr. The combined widths of these edge portions 6s, 2Twa=Tw−Tr, is 50−40=10 $\mu$m, which is much smaller than the read track width Tr so that the signal output (b) read by these edge portions 6s is much lower than the signal output (a). In addition, the greater write gap Gw of the edge portions 6s further lowers the h-f signal output read by the edge portions 6s because of the gap loss.

For example, if two digital write densities of the MFM system, 1F and 2F, are 20 and 40 KFRPI, respectively, the outputs (b) read by the edge portions 6s are about 30 dB lower than the outputs (a) read with the read track width Tr for both 1F and 2F. The high frequencies, which produce a distorted wave with respect to the fundamental wave, have a multiple of the fundamental frequency, and their outputs are further lowered. Thus, a substantial portion of the signal read by the magnetic head is the one which is read with the read track width Tr.

In this way, according to the invention, the signal level read by the edge portions 6s is so low that the data track 11 written with the write track width Tw is little more than the track read with the read track width Tr of the write/read head 21, thus producing the same results as the conventional track of which both edges have been erased by the erase head. As a result, even if the magnetic head is out of position for reading, the read track width Tr is always within the write track width Tw, thereby eliminating any noise arising from the adjacent track.

Figure 4:
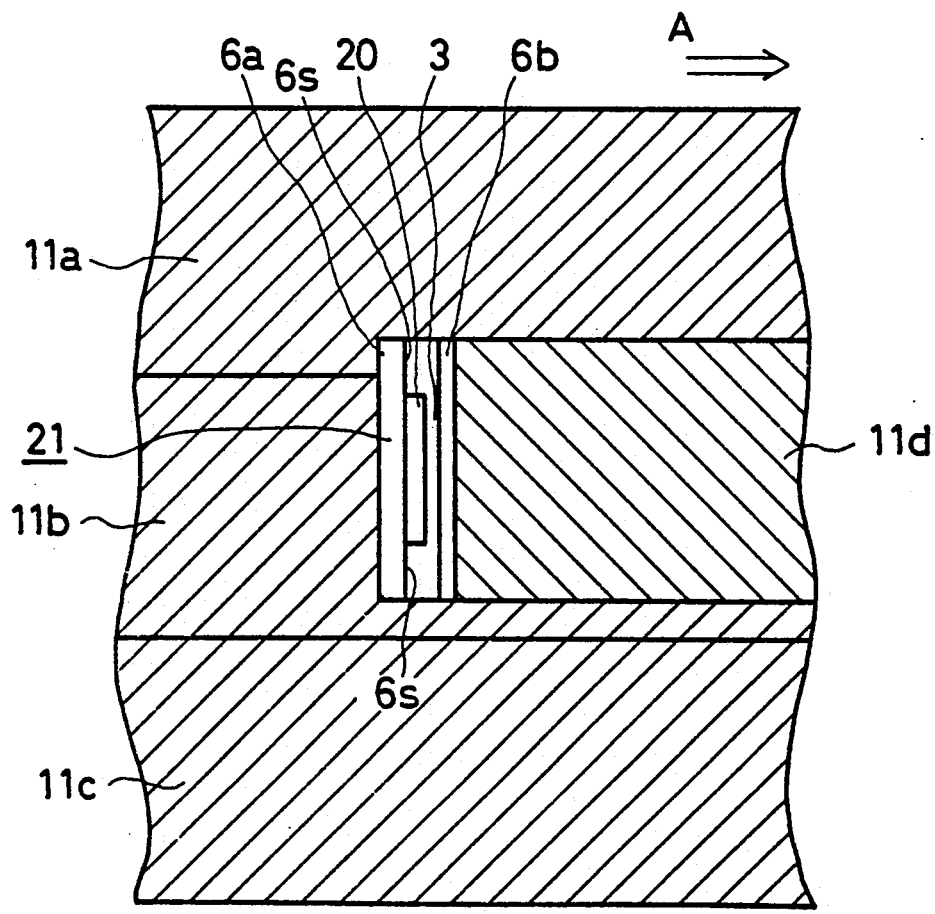
FIG. 4 illustrates the write operation.
Figure 5:
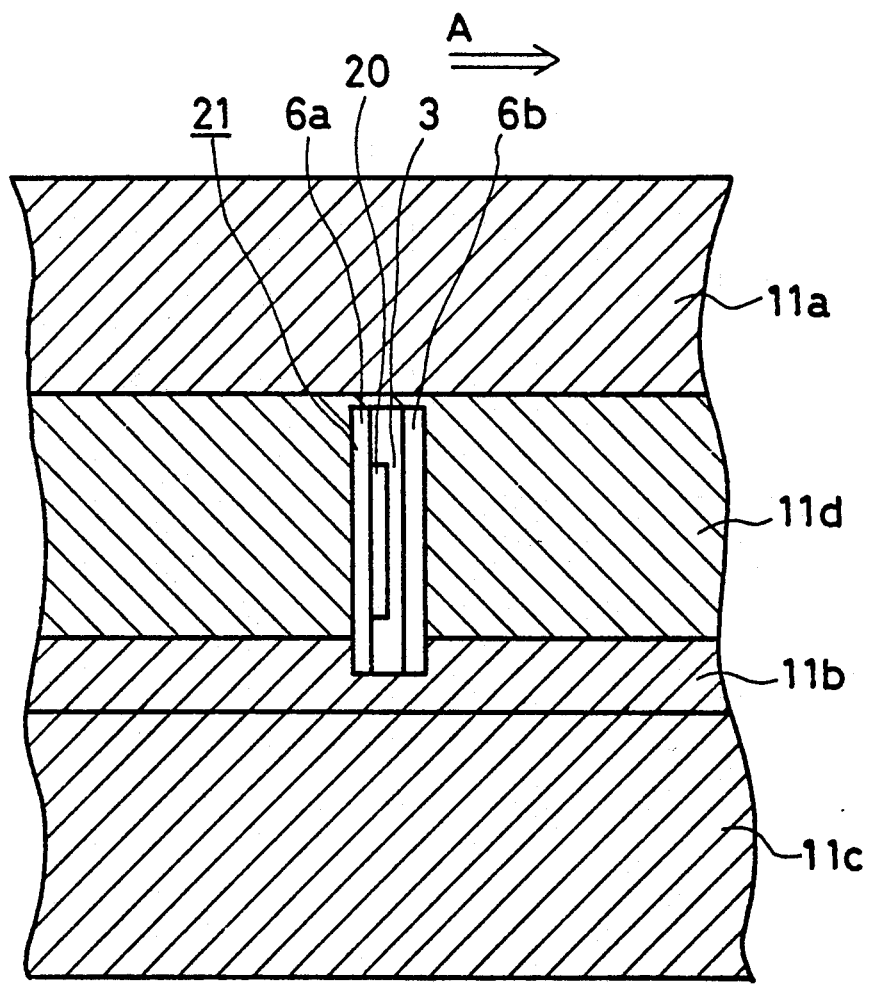
FIG. 5 shows the read operation.

As shown in FIG. 4, there are no guard bands because of the absence of an erase head. When the next data signal is written with the magnetic head out of position from the data track 11b, not all of the prior signal on the track 11b is erased as shown in FIG. 4. However, the read track width Tr always falls within the write track width Tw as shown in FIG. so that the remaining prior signal on the track 11b has no influence.

Preferably, the edge portions 6s of the write read head 21 is filled with a non-magnetic material, such as glass, in order to prevent dust and dirt from attaching thereto.

Figure 8:
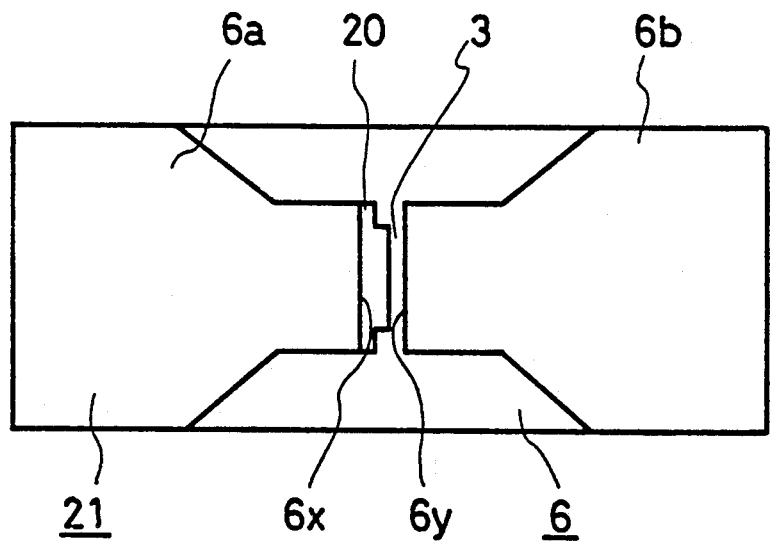
FIG. 8 is a top plan view of a magnetic head according to another embodiment of the invention.

Alternatively, the magnetic material 20 of low saturated flux density may be formed in a T-shape, with the center leg facing the end face 6y of a core leg 6b to form a narrower gap 3, as shown in FIG. 8. This magnetic material 20 produces the same results as those of the above embodiment. The magnetic material 20 may be attached to either end face 6x or 6y of the core leg 6a or 6b via an underlayer in order to improve the adhesion.

Figure 9:
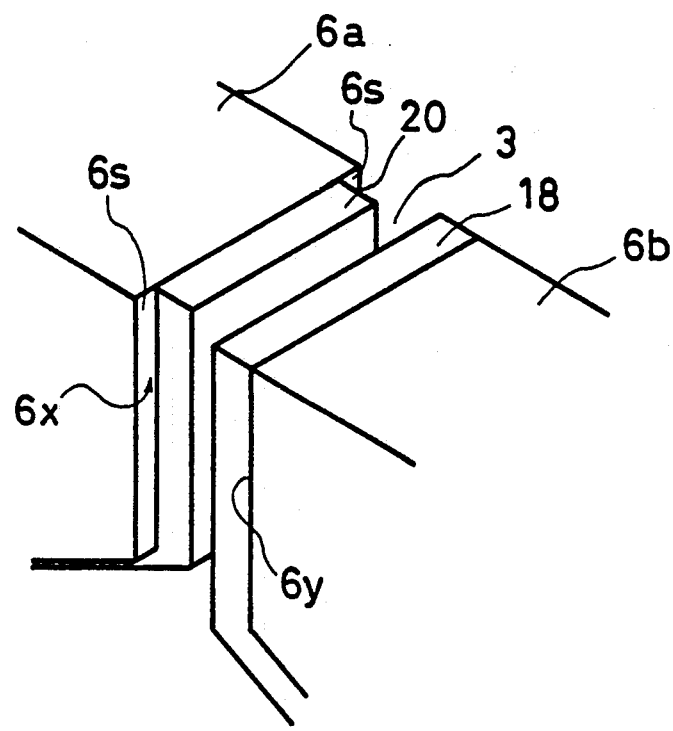
FIG. 9 is an enlarged perspective view of a gap portion of a magnetic head according to still another embodiment of the invention.
Figure 10:
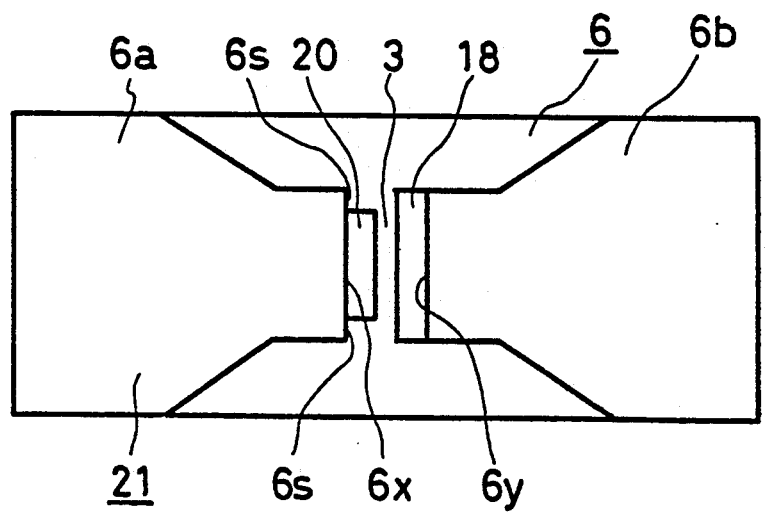
FIG. 10 is a top plan view of the magnetic head of FIG. 9.

As shown in FIGS. 9-10, another magnetic material 18 having a saturated flux density higher than that of the magnetic core 6 may be attached to the end face 6y of a core leg 6b which is opposed to the magnetic material 20 of a low saturated flux density.

Figure 11:
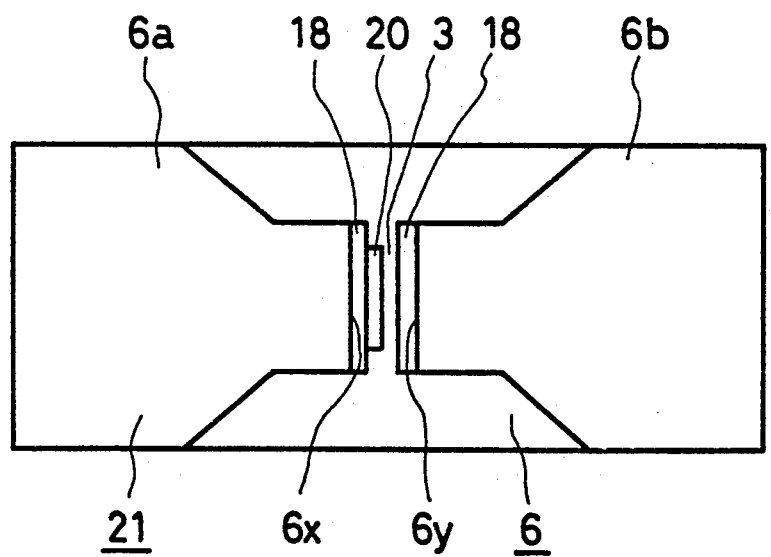
FIG. 11 is a top plan view of a magnetic head according to yet another embodiment of the invention.
Figure 12:
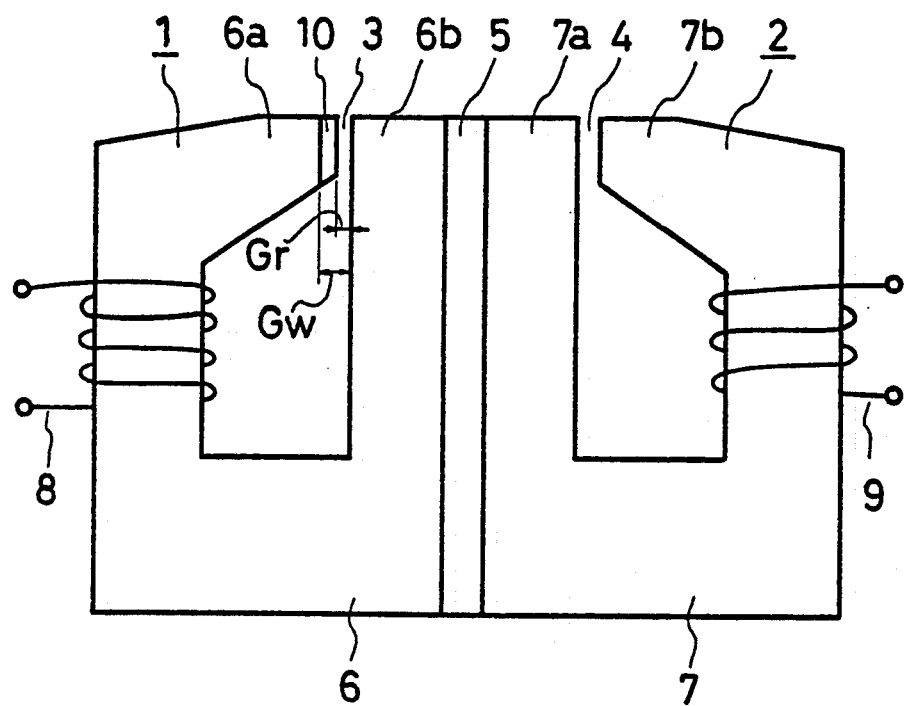
FIG. 12 is an elevational side view of a conventional magnetic head.
Figure 13:
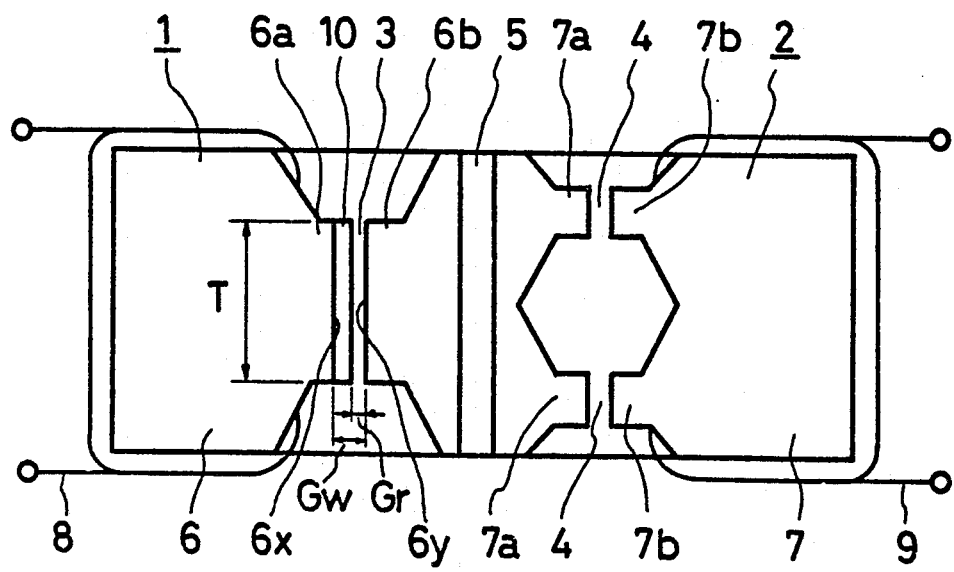
FIG. 13 is a top plan view of the conventional magnetic head.
Figure 14:
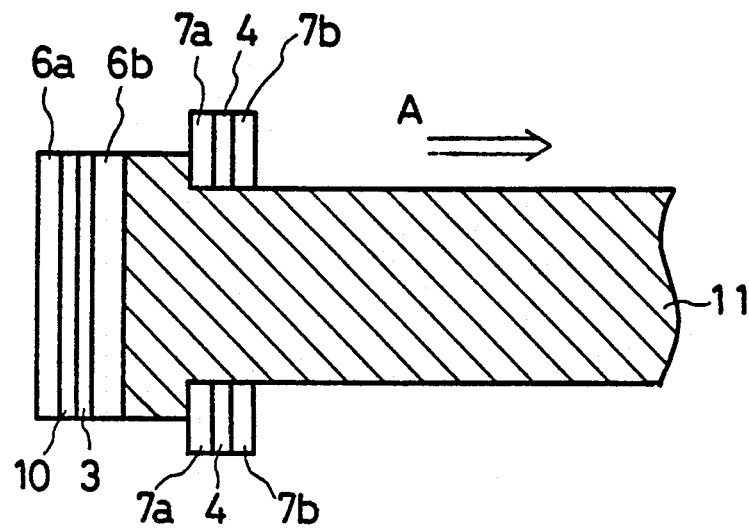
FIG. 14 shows the relationship between the magnetic head and the data track.
Figure 15:
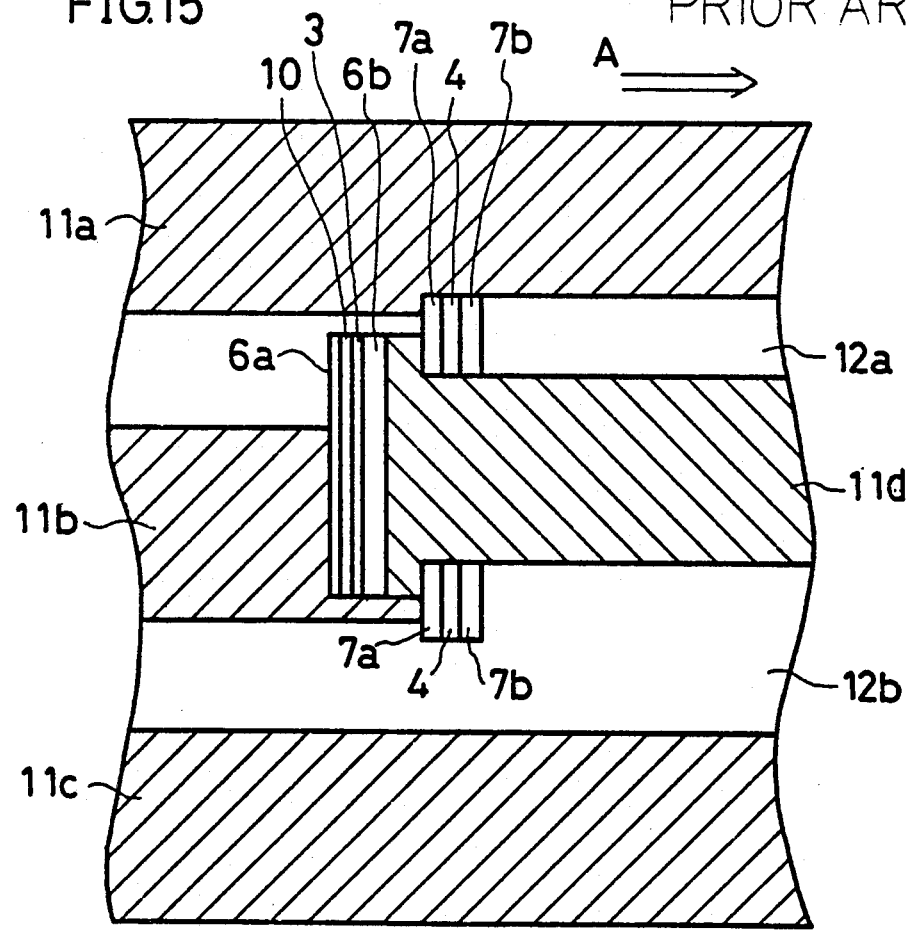
FIG. 15 illustrates the write operation.
Figure 16:
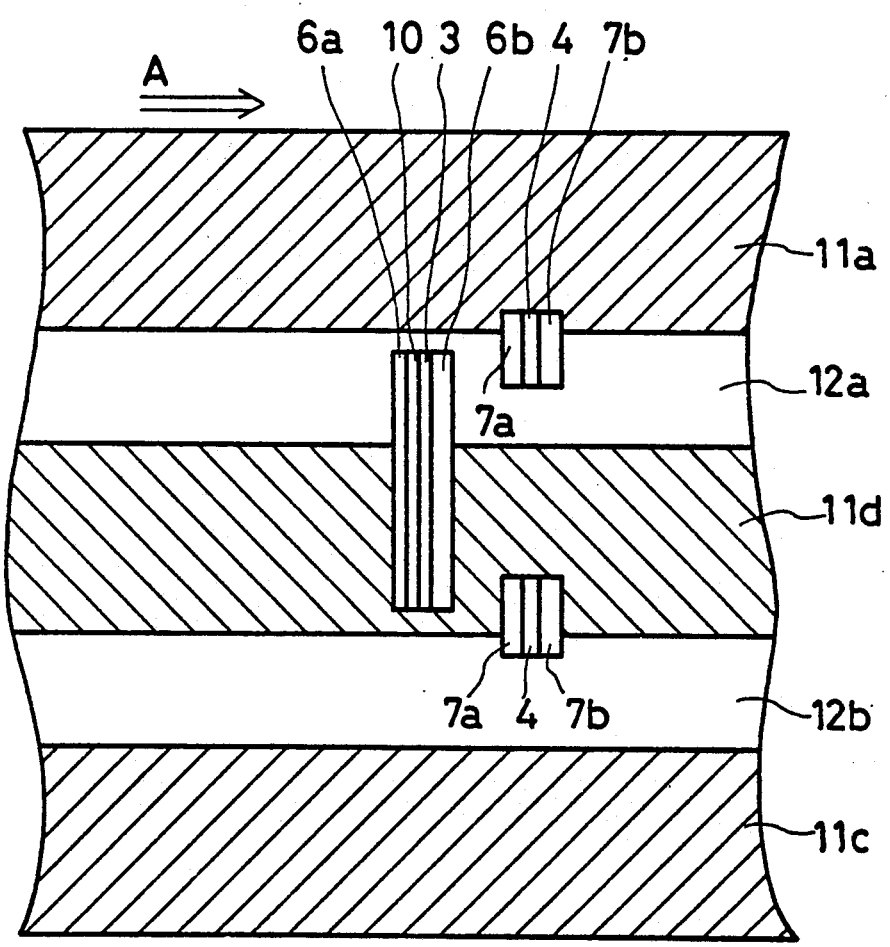
FIG. 16 shows the read operation.
Figure 17:
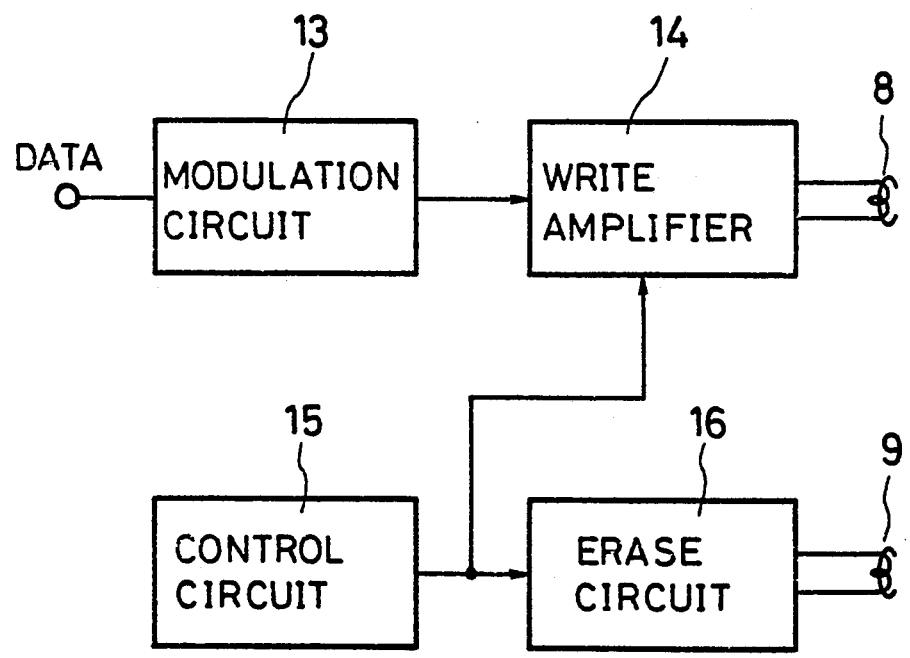
FIG. 17 is a block diagram of a conventional write signal unit.

As shown in FIG. 11, a pair of magnetic materials 18 may be attached to both end faces 6x and 6y of the core legs 6a and 6b, with the magnetic material 20 attached to the end face 6x, to produce the same results as the above embodiment.

As has been described above, according to the invention, since the write/read head has a magnetic material attached to the end face of one of the legs of a magnetic core, the magnetic material having a saturated flux density lower than that of the magnetic core and the read track width of the magnetic material being smaller than the write track width of the magnetic core, no erase head is required, thus simplifying the magnetic head structure. This lowers the unit manufacturing cost and eliminates the circuits associated with the erase head, making the entire device simple and inexpensive.

I claim:

1. A wide-write, narrow-read, single-gap magnetic head comprising:

a substantially U-shaped magnetic core with opposed end faces of a pair of legs having a substantially equal width; and a magnetic material attached to one of said end faces to form a read gap with the other end face, said magnetic material having a saturated flux density lower than that of said magnetic core, and said read gap having a read track width smaller than a write track width made by said opposed end faces.

2. The magnetic head of claim 1, which further comprises a non-magnetic material filled in edge portions of said end faces around said magnetic material.

3. The magnetic head of claim 2, wherein said non-magnetic material is glass.

4. The magnetic head of claim 1, wherein said magnetic material is formed in a substantially T-shape, with a center leg facing said the other end face to form a read gap which is narrower than a write gap formed by said opposed end faces.

5. The magnetic head of claim 1, which further comprises an underlayer provided between said end face and said magnetic material to thereby improve adhesion of said magnetic material to said end face.

* * * * *